United States Patent [19]
Grzech, Jr.

[11] Patent Number: 5,690,046
[45] Date of Patent: Nov. 25, 1997

[54] AMPHIBIOUS VEHICLES

[76] Inventor: Albert S. Grzech, Jr., 383 Argyle Ave., Pasadena, Md. 21122

[21] Appl. No.: 717,720

[22] Filed: Sep. 23, 1996

Related U.S. Application Data

[60] Provisional application No. 60/007,412, Nov. 21, 1995.
[51] Int. Cl.$^6$ ................................. B63B 35/00
[52] U.S. Cl. ............................... 114/270; 440/88
[58] Field of Search ..................... 114/144 R, 270, 114/343, 344; 440/88, 89

[56] References Cited

U.S. PATENT DOCUMENTS

| | | | |
|---|---|---|---|
| 2,350,037 | 5/1944 | Hofheins et al. | 115/1 |
| 3,359,937 | 12/1967 | D'Arena | 115/1 |
| 3,755,835 | 9/1973 | Boersig | 9/1 T |
| 3,903,831 | 9/1975 | Bartlett et al. | 115/1 A |
| 4,241,686 | 12/1980 | Westphalen | 440/59 |
| 4,387,661 | 6/1983 | Dutt | 114/270 |
| 4,723,451 | 2/1988 | Ishimatsu | 74/15.69 |
| 4,958,584 | 9/1990 | Williamson | 114/270 |
| 5,176,098 | 1/1993 | Royle | 114/344 |
| 5,178,088 | 1/1993 | Howard | 114/270 |
| 5,531,179 | 7/1996 | Roycroft et al. | 114/270 |
| 5,562,066 | 10/1996 | Gere et al. | 114/270 |

FOREIGN PATENT DOCUMENTS

WO8910854  11/1989  WIPO.

*Primary Examiner*—Stephen Avila
*Attorney, Agent, or Firm*—Bartlett & Scherer; Edward D. C. Bartlett

[57] ABSTRACT

An amphibious vehicle has a heat engine with an ambient air cooling system primarily employed for cooling the engine during travel on land, and an external water cooling system primarily for cooling the engine during travel on water. The engine is mounted in a sealed interior of the hull body of the vehicle. There is a retractable front steerable wheel and at least one retractable rear wheel. A propulsion unit, preferably a water jet pump, propels the vehicle in water. The engine is directly cooled by a re-circulating liquid coolant, and the cooling systems include a heat exchanger having an air chamber through which ambient air flows, a liquid coolant chamber through which the liquid coolant flows, and one or more fins exposed outside the hull body in contact with external water during water travel. In a preferred form the vehicle is a personal watercraft in water and a three-wheel motorcycle on land.

24 Claims, 11 Drawing Sheets

FIG. 4
FIG. 3
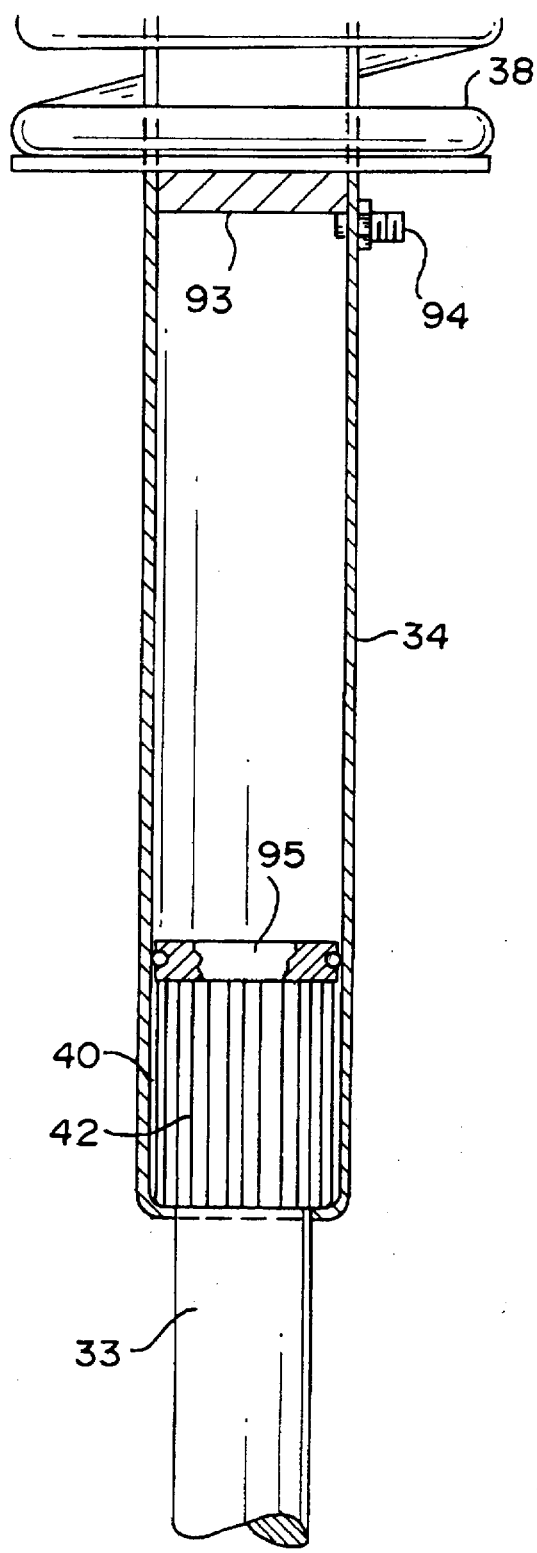
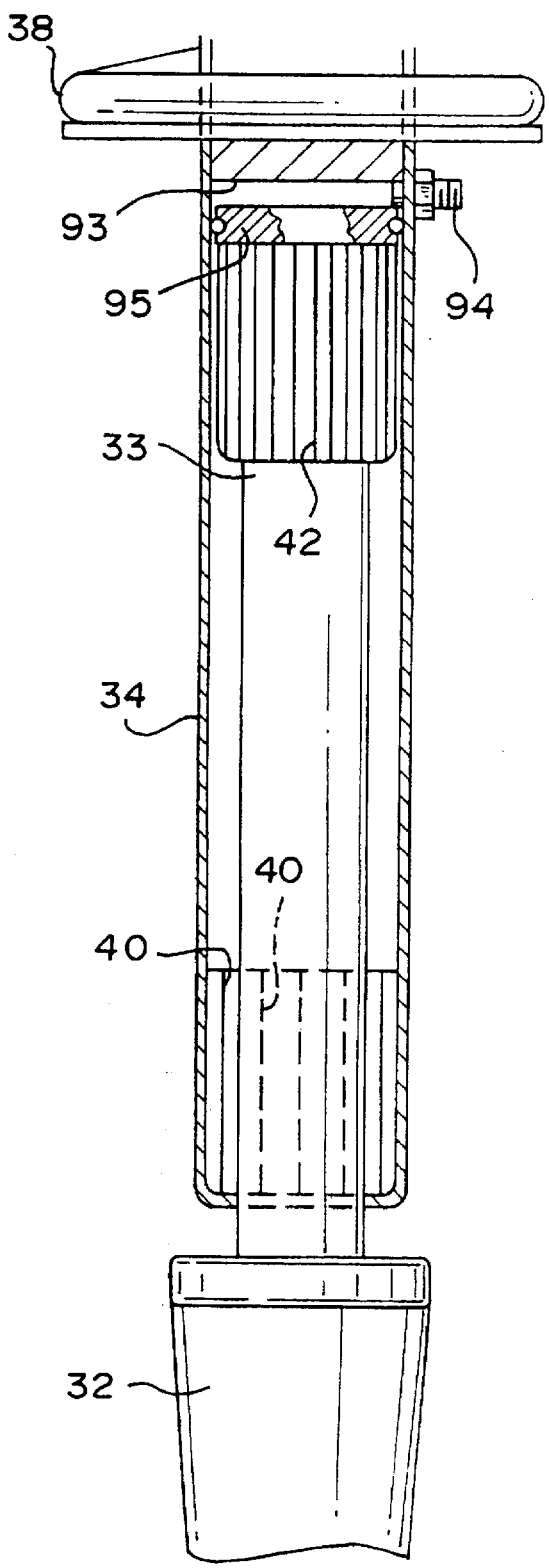

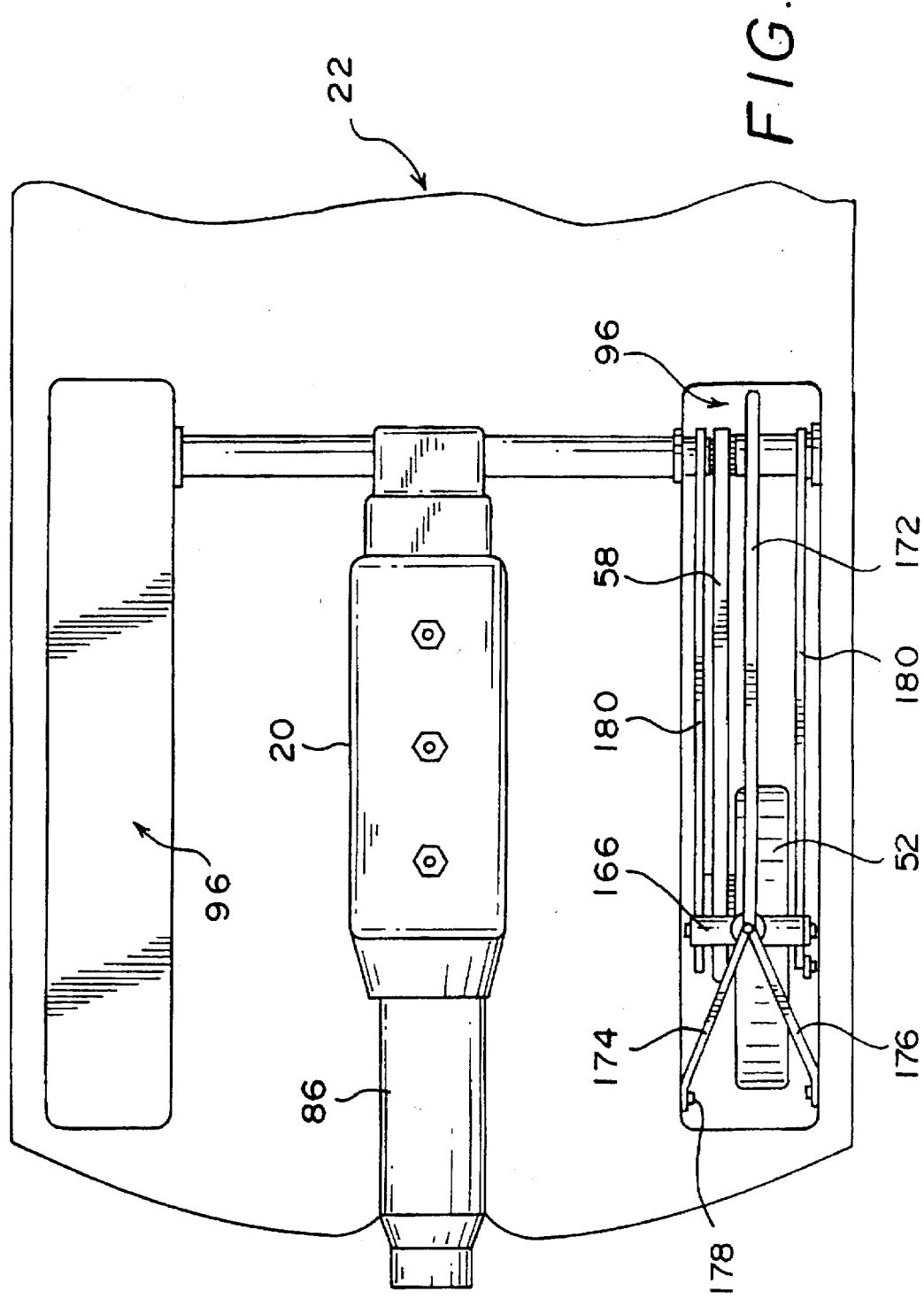

AMPHIBIOUS VEHICLES

This application claims the benefit of U.S. Provisional Application No. 60/007412 filed Nov. 21, 1995.

FIELD OF THE INVENTION

This invention relates to vehicles in general, particularly water-borne vehicles and amphibious vehicles.

BACKGROUND OF THE INVENTION

Amphibious power vehicles have been proposed which have retractable road wheels, the wheels being retracted upwardly for water travel, but being lowered for ground travel.

The amphibious power vehicles of the prior art are mostly compromised as regards land use, or water use, or both. Also, if the amphibious vehicle has to satisfy automobile road regulations, this can substantially influence the cost, particularly the regulations concerning four wheel passenger cars.

There are many highly specialized road vehicles and many highly specialized watercraft, all powered by heat engines, but these vehicles are solely for use on land or on water and are not amphibious. A popular and well known type of watercraft, used virtually exclusively for water sport, is for example a so called Jet Ski (trademark), and which classification of vehicle is now generically referred to as a personal watercraft. A personal watercraft is driven by a water jet issuing from the rear of a somewhat streamlined body, the water jet being generated by a motor driven pump. The personal watercraft is steered by turning a pair of handlebars which steer the water jet.

SUMMARY OF THE INVENTION

One aspect of the present invention is concerned with providing an improved amphibious vehicle, particularly an amphibious vehicle having both good water travel performance and good land travel performance.

Another aspect of this invention is concerned with providing a compact amphibious vehicle readily capable of being carried on board a pleasure craft, such as a yacht or launch, and usable as transport between the pleasure craft and land as well as on land.

Another aspect of this invention is concerned with providing a versatile cooling system for a heat engine, such system being usable with either a land vehicle or a boat, and so being particularly appropriate for use in an amphibious vehicle. This new versatile cooling system is particularly suitable for an internal combustion engine when confined in a sealed compartment, such as the sealed hull of a personal watercraft.

Accordingly, there is provided by one aspect of the present invention, an amphibious vehicle comprising a body having a front and a rear with a heat engine having an ambient air cooling system primarily employed for cooling the engine during travel on land, and an external water cooling system primarily for cooling the engine during travel in water. A retractable and steerable front wheel is located at the front of the body, at least one retractable wheel is located at the rear of the body, and at least one of the wheels is drivable by the engine. A propulsion unit propels the vehicle in water and is drivable by said engine.

The cooling systems may include a heat exchanger having an air chamber through which the ambient air flows, a liquid coolant chamber through which liquid coolant of the engine flows, and a surface exposed outside the body in contact with external water during water travel. Advantageously, the liquid coolant chamber may be disposed between the air chamber and the surface.

Preferably, the surface comprises one or more fins.

The fins may be located under the body and extend parallel to each other in a front to rear direction.

The fins may extend downwardly from the bottom of the body to different depths. Preferably, the forward ends of the fins are tapered.

The amphibious vehicle may have a hull defining a planing surface in the water mode, and a lower surface of the liquid coolant chamber may be in and form part of this planing surface. The fins preferably extend down below the planing surface.

There may be two rear wheels each mounted on a swinging arm pivotally connected to the body, each rear wheel being separately driven from the engine via differential gearing.

A separate hydraulic cylinder may be connected between each wheel and the body for retracting and lowering the wheels, respectively, for water and land travel. Preferably there is means for simultaneously operating all of the hydraulic cylinders to retract and lower all of the wheels together.

According to another aspect of the present invention, there is provided a vehicle comprising a body, a heat engine mounted in the body and being directly cooled by a re-circulating liquid coolant, a heat exchanger mounted through the body and comprising an air chamber, a liquid coolant chamber, and one or more cooling fins. The liquid coolant chamber is in thermal contact with the air chamber and the cooling fin or fins, and is connected to the engine to permit re-circulation of the liquid coolant through the engine and the liquid coolant chamber. An air inlet and an air outlet are both connected to the air chamber to enable passage of ambient air in through the air inlet, through the air chamber, and out through the air outlet. The cooling fin or fins are exposed externally of the body.

Advantageously, the cooling fin or fins may be located underneath the body.

The air chamber may have internal air fins between which the ambient air circulates. The liquid coolant chamber may have a first series of internal fins conductively in communication with the air fins and a second series of internal fins conductively in communication with the externally exposed cooling fin or fins.

The liquid coolant chamber may be sandwiched between the air chamber and the cooling fin or fins. Preferably, the first and second series of internal fins are interleaved with each other.

Preferably, the internal air fins and the first series of internal fins extend from opposite sides of a first heat conductive member, and the second series of internal fins and the externally exposed cooling fin or fins extend from opposite sides of a second heat conductive member.

Advantageously, the internal air fins and the externally exposed cooling fin or fins may have total surface areas in the ratio of at least 20 to 1, preferably 25 to 1.

Preferably, the internal air fins and the first series of internal fins are formed by a first metal casting, the second series of internal fins and the externally exposed cooling fin or fins are formed by a second metal casting which is secured to the first metal casting, and at least one of the castings is secured to the body around a periphery of a hole in the body of the vehicle.

Preferably, the body has a planing surface on which the vehicle hydroplanes when driven in water. Advantageously, the cooling fin or fins extend downwardly from this planing surface.

According to yet another aspect of the present invention, there is provided an amphibious vehicle comprising a body having a sealed interior and no open load carrying area capable of retaining water, the amphibious vehicle when flipped upside down in water not submerging, a seat on the body externally thereof enabling a person to ride on the body as opposed to riding in the body. An internal combustion engine is mounted in the sealed interior, with a jet pump drivable from the engine. A front steerable wheel is mounted in a wheel well at a front of the body, the front wheel extending from the wheel well for travel on land and being retractable into the wheel well for travel in water, the front wheel well being exterior to the sealed interior. A cover is movably mounted on the body and operable to close the wheel well when the front wheel is retracted into the wheel well. At least one rear wheel is retractably mounted on the body, exterior to the sealed interior, and a transmission is connected between the engine and at least one of the wheels.

Preferably, handlebars are rotatably mounted in the body for steering the amphibious vehicle on land and in water, the jet pump having a jet nozzle connected to and pivotal by the handlebars. The front wheel may be telescopically connected to the handlebars for accommodating the extending and retracting of the front wheel, the front wheel when telescopically extended turning with the handlebars, but the front wheel being rotatably disconnected from the handlebars when telescopically retracted.

Preferably, there is a rear wheel well into which the rear wheel is retractable, and a movable rear cover mounted on the body for opening and closing the rear wheel well. A raisable suspension may mount the rear wheel on the body, and a linkage may be connected between the rear cover and the suspension to effect opening and closing of the rear wheel well by the cover as the suspension is respectively lowered and raised.

According to yet a further aspect of the present invention, there is provided an amphibious vehicle comprising a body having a front and a rear with a wheel well at the front, a front steerable wheel mounted in the wheel well and connected by a telescopic strut to a steering member mounted on the body for steering the front wheel, extension of the telescopic strut extending the front wheel out of the wheel well and steeringly engaging the steering member with the front wheel, and retraction of the telescopic strut retracting the front wheel into the wheel well and disconnecting steering engagement between the steering member and the front wheel.

Preferably, the telescopic strut includes two splined elements movable into and out of engagement with each other by extension and retraction, respectively, of the telescopic strut.

The telescopic strut may comprise a hydraulic cylinder rotatably mounted in the body, a first ring of splines in the cylinder, a fork member in which the front wheel is rotatably mounted, the fork member being telescopically mounted in the cylinder, and a second ring of splines on the fork member, the second ring of splines being slidably engageable with and slidably disengageable from the first ring of splines by telescopic extension and retraction of the fork out of and into, respectively, the cylinder.

According to yet a further aspect of the present invention, there is provided an amphibious vehicle, comprising a body having a front and a rear, a motor for propelling the vehicle on land and water, the body having a sealed interior housing the motor, a front wheel well located at the front of the body, a front steerable wheel mounted retractably in the front wheel well, a seat mounted on the body externally thereof and above the sealed interior, a pair of rear wheel wells located at the rear of the body on opposite sides of the seat, and a rear wheel retractably mounted in each rear wheel well. An upper portion of each rear wheel well is formed by a somewhat dome-shaped cover connected to the body and extending upwardly, preferably to above the seat, these two covers being disposed along side and spaced transversely from the seat and providing lateral protection for a rider when seated on the seat. Upwardly extending retractable suspension members for the rear wheels are advantageously accommodated inside the covers.

Each suspension member may comprise a wheel mounting fork attached to a lower end of a telescopic member. A tripod of struts may extend upwardly from the body inside each cover, an upper end of the telescopic member being connected to an apex of the tripod.

Preferably, the amphibious vehicle is an amphibious personal watercraft operative as a personal watercraft in water and a three-wheel motorcycle on land.

Other objects, features and advantages of the present invention will become more fully apparent from the following detailed description of the preferred embodiments, the appended claims and the accompanying drawings.

BRIEF DESCRIPTION OF THE DRAWINGS

In the accompanying drawings, in which in different Figures like reference characters indicate like parts:

FIG. 3 is an elevational view, partly in section, of a telescopic steering strut, in a retracted position, of the front wheel of the amphibious vehicle of FIG. 1;

FIG. 4 is a view similar to FIG. 3 with the telescopic steering strut in an extended position;

FIG. 13 is a partial plan view, partly sectioned, of the embodiment of FIG. 8 showing details of the right rear wheel.

DETAILED DESCRIPTION OF THE PREFERRED EMBODIMENTS

Three embodiments of the present invention are shown in FIGS. 1 to 6, FIG. 7, and FIGS. 8 to 13. The embodiment of FIGS. 8 to 13 is the preferred embodiment.

All three embodiments have retractable wheels and function as a personal watercraft in water and a three wheel motorcycle on land. These three embodiments have many parts and mechanisms in common, such as the steering mechanism, the mounting of the front wheel, the engine, differential independent driving of the two rear wheels, and the cooling system for the engine. Each embodiment is basically a personal watercraft (e.g. a Jet Ski) as used for water sport, modified to accommodate three retractable motorcycle wheels, the transmission of the personal watercraft being modified to selectively drive the water jet pump or the rear wheels, and an innovative cooling system being incorporated to use primarily ambient air for secondary cooling on land and primarily external water for secondary cooling when in water. In each case, the secondary cooling cools a liquid coolant circulating through the engine, and thus the secondary cooling is the effective cooling of the engine.

Figure 1:
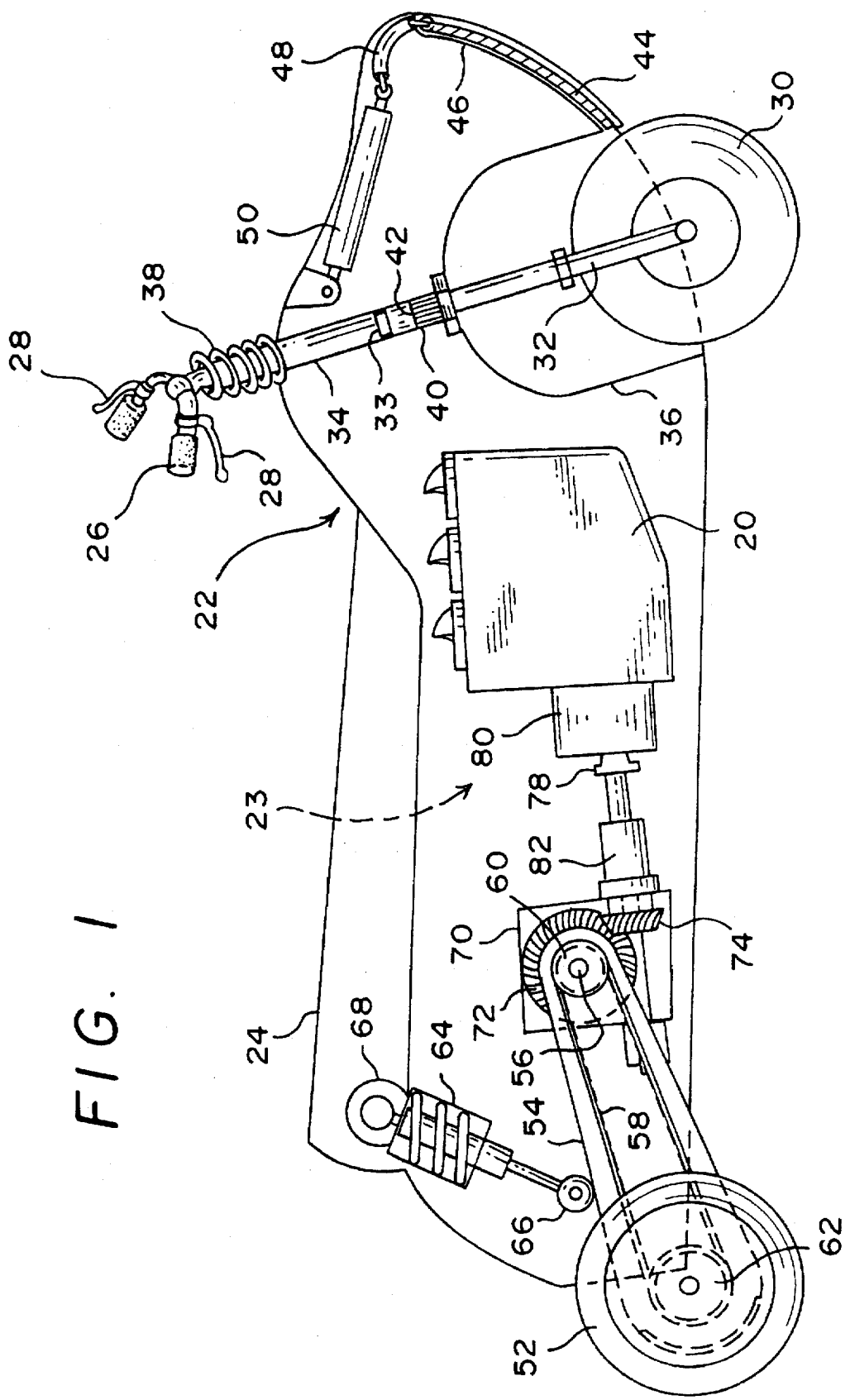
FIG. 1 is a diagrammatic side view of an amphibious vehicle according to the present invention in a land travel mode and partly sectioned to show some internal parts.
Figure 2:
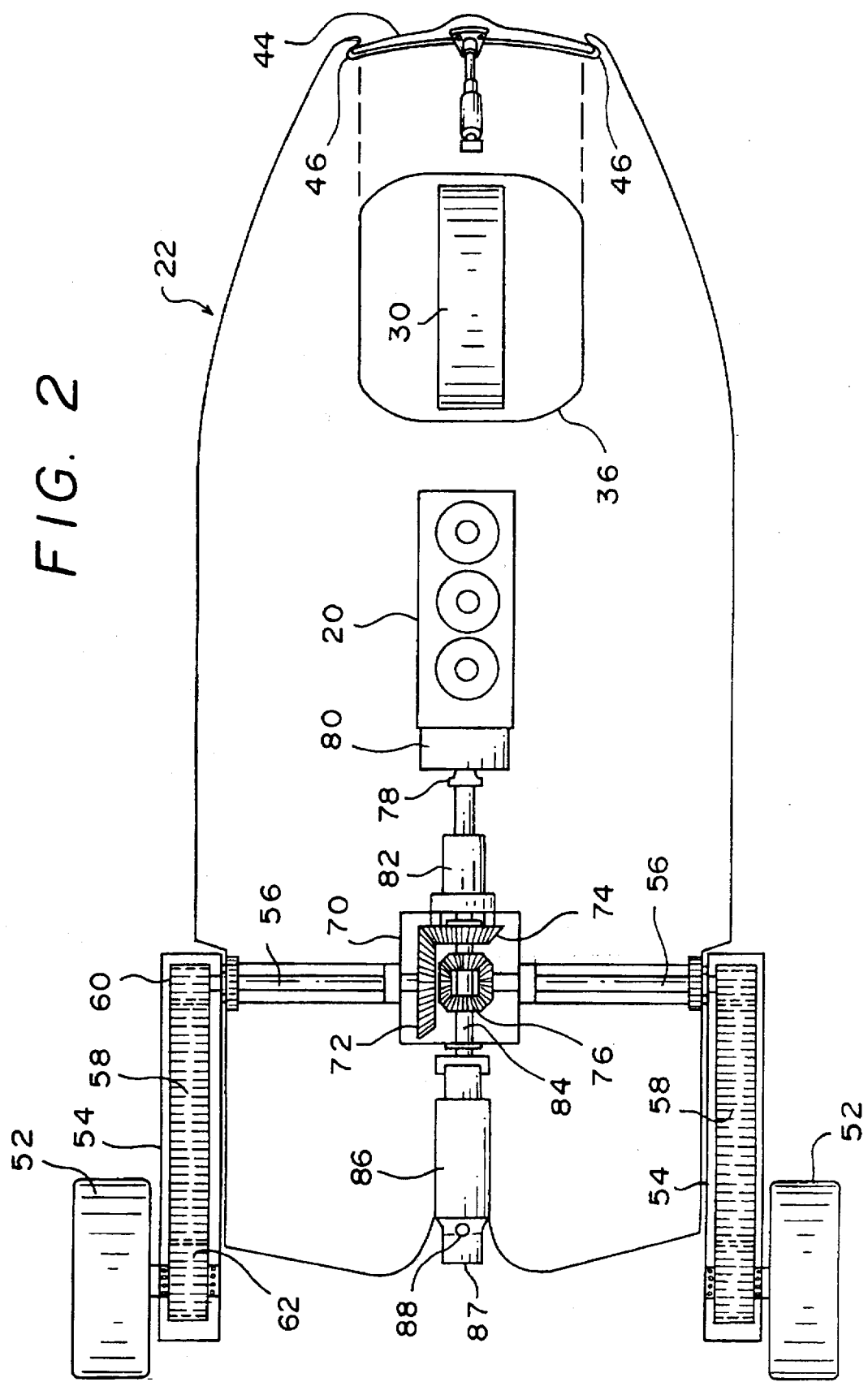
FIG. 2 is a plan view of the amphibious vehicle of FIG. 1, again partly sectioned to show various internal parts.
Figure 8:
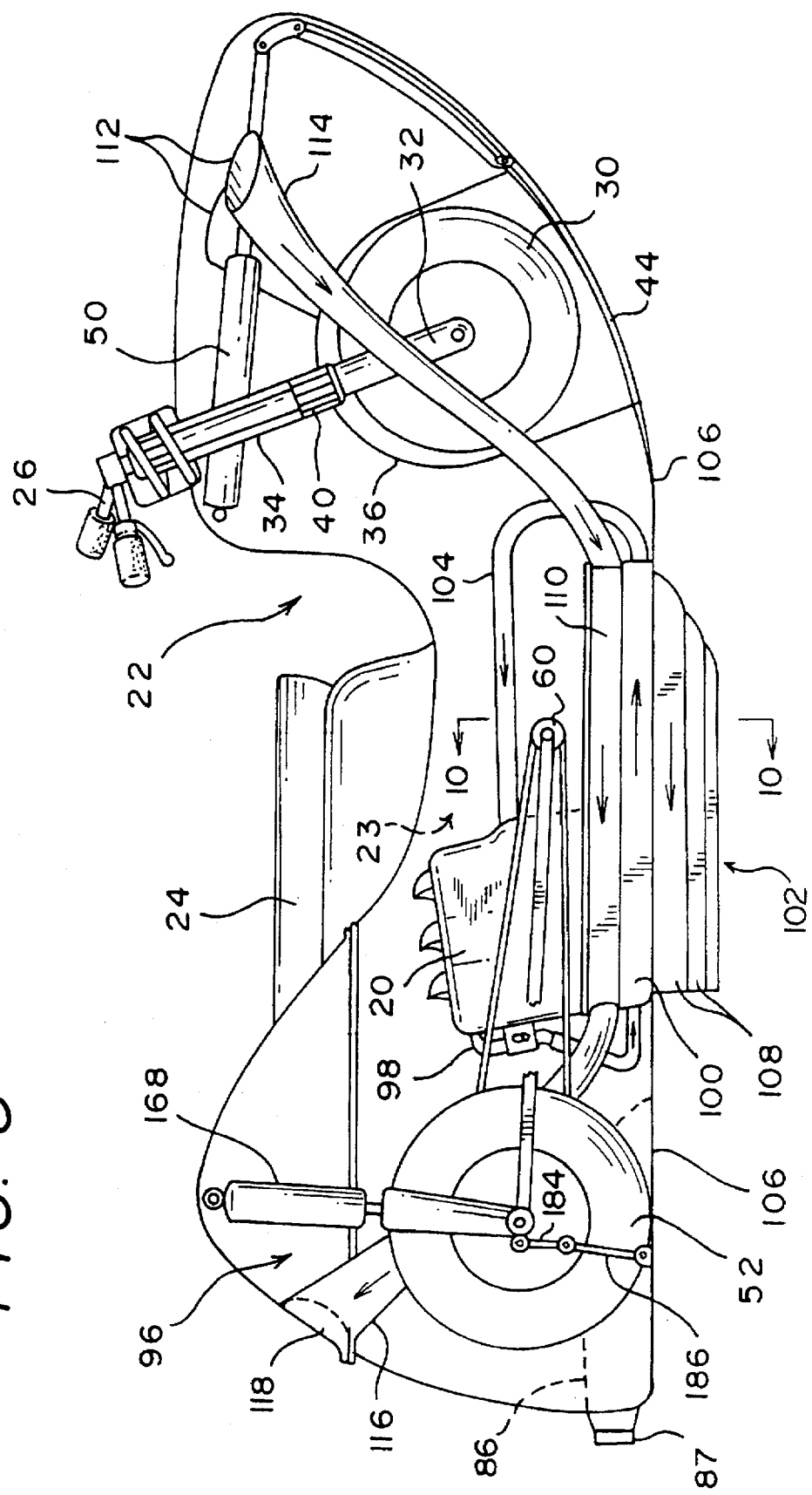
FIG. 8 is a schematic side view of a third embodiment of the present invention in a water travel mode and partly in section to show various internal parts.

In the FIGS. 1 to 6 embodiment, the engine 20 is mounted just forward of the center of a personal watercraft body 22, the engine being a conventional personal watercraft engine such as, for example, a three cylinder two-stroke internal combustion engine. The body 22 is formed as a hull with a sealed interior 23 enclosing and protecting the engine 20 from water contact should the hull cap-size. A seat 24 extends rearwardly from above the engine 20, and a steering member, conveniently handlebars 26, is rotatably mounted on the body 22 adjacent the front of the amphibious vehicle. Control levers 28 are mounted on the handlebars 26 as with conventional motorcycles for a wheel brake and a clutch to disengage the engine drive. A front motorcycle wheel 30 is rotatably mounted at the lower end of a pair of forks 32, an upper end 33 of which telescopically engages in a hydraulic cylinder 34 to the upper end of which the handlebars 26 are connected. The lower front of the personal watercraft body 22 is formed with an open bottomed wheel well 36. The hydraulic cylinder 34 retracts the front wheel 30 into the well 36 for water use and extends the front wheel 30 downwardly below the well 36 for land use. The hydraulic cylinder 34 is operated by an electrically driven hydraulic pump mounted adjacent the wheel well 36 and powered from the conventional battery and electrical system of the personal watercraft. The outer casing of the hydraulic cylinder 34 is mounted in a sleeve bearing in the body 22 for relative rotation about a central steering axis of the forks 32. A coil spring 38 is compressed between the handlebars 26 and the body 22 to provide resilient suspension of the front wheel 30. Dampening of the front wheel movement may be incorporated in the hydraulic cylinder 34 or may be via one or more dampener units disposed adjacent and parallel to the hydraulic cylinder 34. The lower end of the cylinder 34 is provided internally with a ring of splines 40 concentrically disposed about the steering axis. A cooperating ring of splines 42 is formed around a portion of the fork upper end 33 and slidingly engage inside the cylinder splines 40. When the cylinder 34 extends the front wheel to the road position shown in FIG. 1, the fork splines 42 fully engage with and inside the cylinder splines 40 so that steering movement of the handlebars 26 about the steering axis is directly transmitted to the front wheel 30 (see also FIG. 4). However, when the cylinder 34 retracts the wheel 30 into the wheel well 36, the fork splines 42 move upwardly and fully disengage from the cylinder splines 40 (see also FIG. 3); steering movement of the handlebars is then no longer transmitted to the front wheel 30 which remains inoperative in the retracted position. A retractable cover 44 is slidably mounted in grooves 46 at the front of the body 22, the grooves 46 extending rearwardly on each side of the wheel well 36. A flexible telescopic cable 48 connects an upper forward edge of the cover 44 to a hydraulic cylinder 50 mounted in the body 22. Actuation of the cylinder 50 slides the cover 44 from a retracted storage position as shown in FIGS. 1 and 2 to a rearwardly extended position covering and closing the wheel well 36 (as shown in FIG. 8). Retracting and extending the front wheel 30 is coordinated with closing and opening of the wheel well 36 by the cover 44.

A sensor switch may be associated with the front wheel suspension to sense when the front wheel is parallel to the fore-aft direction, this sensor switch disabling the hydraulic pump for retracting the front wheel upwards until the front wheel is so parallel. This enables the front wheel well 36 to be designed narrower with just a lower belling out portion to accommodate steering movement on land.

Each rear wheel 52 is disposed outside and to the rear of the body 22. Each rear wheel 52 is rotatably mounted at the trailing end of a swinging arm 54 pivotally attached at a forward end to the body 22 concentric with a drive shaft 56. The arm 54 is formed by a cast aluminum housing which contains a timing belt 58 (such as a Gilmer slotted drive belt) entrained around a drive sprocket 60 and a rear wheel sprocket 62. Swinging movement of each arm 54 is controlled by a coil spring/shock absorber unit 64 pivotally attached at 66 to the respective arm 54 and at 68 to the body 22. The unit 64 includes a hydraulic cylinder which is actuated to lower the respective rear wheel partially below the body 22 as in FIG. 1, for motorcycle use, and to raise the rear wheel above the bottom of the body 22 for personal watercraft use. The hydraulic cylinders of the two units 64 can be operated simultaneously with the front wheel cylinder 34, for example, by the same electrically driven pump which operates cylinder 34.

The two drive shafts 56 extend from opposite sides of a gear case 70 containing hypoid ring and pinion gears 72, 74 together with planetary differential gears 76 to form a differential drive to the two rear wheels 52. The pinion 74 is connected to the output shaft 78 of a clutch 80 of the engine 20. A sliding splined sleeve unit 82 selectively engages the output shaft 78 drivingly with either the pinion gear 74 or a drive shaft 84 of a water jet pump unit 86, the drive shaft 84 passing straight through the gear case 70. The water jet pump unit 86 is as conventionally employed in personal watercraft, and the nozzle 87 for its output jet turns about a pivot 88 for steering in water. This pivotal action of the output jet from the pump unit 86 is controlled by the turning of the handlebars 26 as is conventional in personal watercraft. The movement of the splined sleeve unit 82, to change the drive between the jet pump unit 86 and the rear wheels 52, can be effected by a gear lever or by a hydraulic cylinder with a control on the handlebars 26. The control for operating the wheel hydraulic cylinders 34 and 64 may also conveniently be located on the handlebars.

FIGS. 3 and 4 illustrate the telescopic operation of the cylinder 34 and upper end 33 of the front wheel forks, FIG. 3 showing the retracted position (with the front wheel 30 as in FIG. 8) and FIG. 4 showing the extended position (as in FIG. 1). The cylinder 34 has a cylinder head 93 with a hydraulic fluid connector 94 just below the cylinder head.

The upper end 33 of the front wheel forks terminates in a piston 95. The fork splines 42 are disposed just below the piston 95. In FIG. 3, the external splines 42 of the forks are shown fully disengaged from and spaced from the internal splines 40 of the cylinder 34, so preventing rotation of the cylinder 33 being transmitted to the forks 32. In FIG. 4, the splines 42 are fully engaged inside the splines 40, so transmitting rotation of the cylinder 34 to the forks 32.

Figure 5:
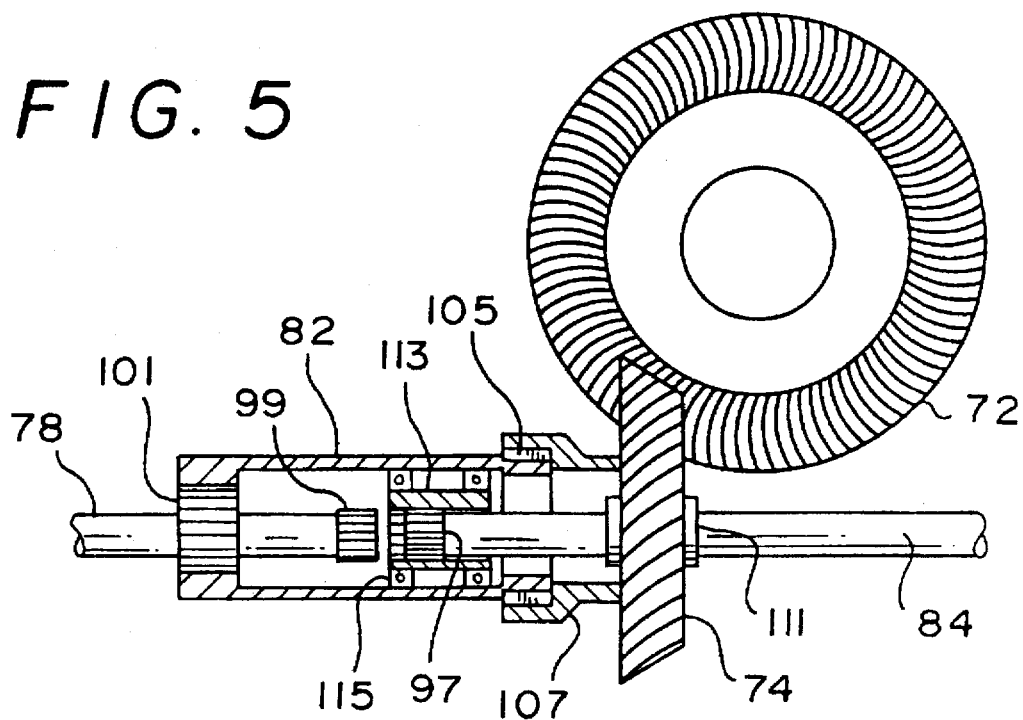
FIG. 5 is a vertical section of a drive coupling arrangement of the amphibious vehicle of FIG. 1 in a land drive mode.
Figure 6:
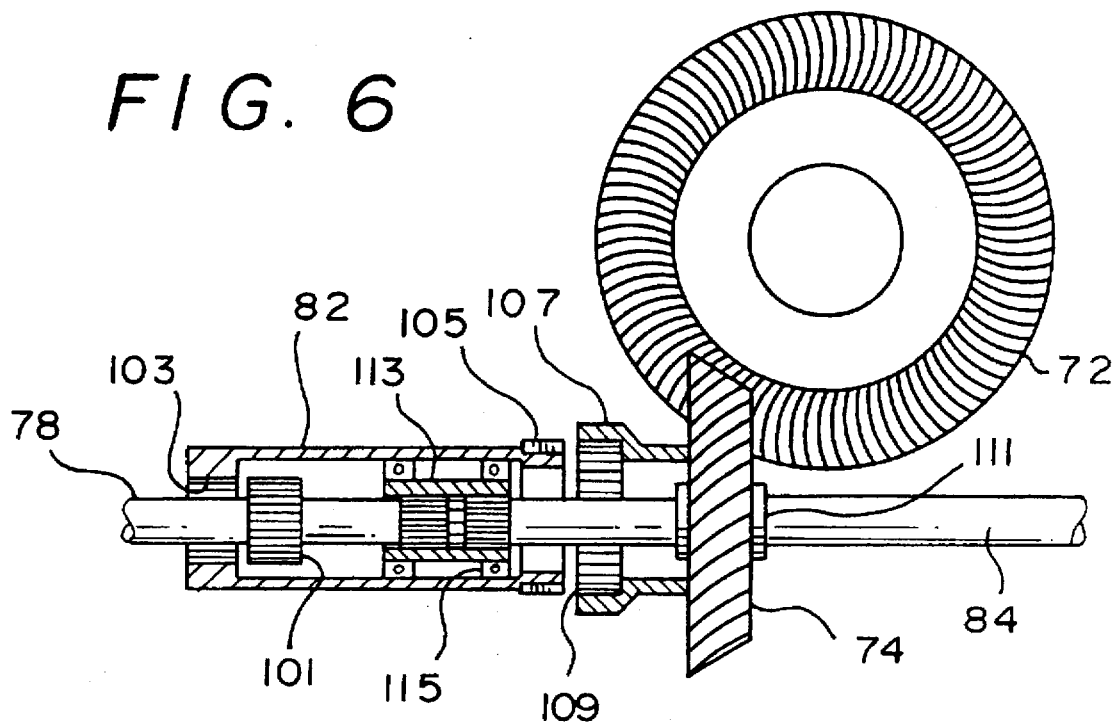
FIG. 6 is the section of FIG. 5 in a water drive mode.

FIGS. 5 and 6 illustrate the selective operation of the coupling unit for drive of the rear wheels in FIG. 5 and for drive of the jet pump in FIG. 6. The section in FIGS. 5 and 6 is taken from the left side of the vehicle looking towards the right side, i.e. looking downwards from the top of FIG. 2. The forward end of the pump shaft 84 is formed as an external spline 97. The rear end of the engine drive shaft 78 is also formed as a similar external spline 99 spaced a short distance from the spline 97. A larger external spline 101 is secured on the drive shaft 78 forwardly of the spline 99. The forward end of the sleeve 82 is formed with an internal spline 103, whereas the rear end of sleeve 82 is formed with an external spline 105. The hypoid pinion 74 is provided with a drive sleeve 107 having at a free end an enlargement containing a large internal spline 109. The hypoid pinion 74 is freely rotatably mounted on the drive shaft 84 by a ball race 111. An inner sleeve 113 is internally splined throughout its entire length, and is freely rotatably mounted inside sleeve 82 by two spaced apart ball races 115. Each of these splines is formed by a cylindrical ring of splines.

When the sleeve 82, together with inner sleeve 113, is selectively moved rearwardly as in FIG. 5, the large external spline 105 of sleeve 82 drivingly engages inside the large internal spline 109 of pinion drive sleeve 107, the splines 103 and 101 engage, and the inner sleeve 113 only engages the shaft spline 97; this effects a driving connection between the engine drive shaft 78 and the pinion 74 to drive the rear wheels, while at the same time removing any drive to the pump shaft 84. In this disposition, it will be noted that although the splines of the inner sleeve 113 and the pump shaft 84 are engaged, the ball races 115 allow the sleeve 82 to rotate about the pump shaft 84 without transmitting any rotational drive to the pump shaft.

When the sleeve 82 with the inner sleeve 113 are moved forwardly as in FIG. 6, the splines 103 and 105 respectively disengage from the splines 101 and 109, and the shaft splines 97 and 99 are both now engaged by the internal spline of the inner sleeve 113. This drivingly couples the engine drive shaft 78 to the pump shaft 84 while disengaging drive to the drive sleeve 107 of the pinion 74.

In use, the wheels 30, 52 may be raised or lowered while the amphibious vehicle is in water. This is convenient when entering the water from land or leaving the water for land. With the wheels retracted and the cover 44 closing the wheel well 36, the vehicle can be used in water conventionally as a hydroplaning personal watercraft, the front of the body 22 presenting a smooth profile to the water and the rear wheels 52 being raised to mitigate water drag. Steering by the handlebars pivots only the jet issuing from jet pump unit 86 as steering to the front wheel 30 has been disabled. With the wheels lowered, the steering to the front wheel becomes effective and the vehicle can be driven as a three wheel motorbike, each rear wheel having differential independent drive. In this land mode, although the drive to the jet pump unit 86 is disconnected, the nozzle 87 of this unit 86 still is pivoted by the handlebars 26, but this has no adverse effect on the driving of the three wheel vehicle.

Figure 7:
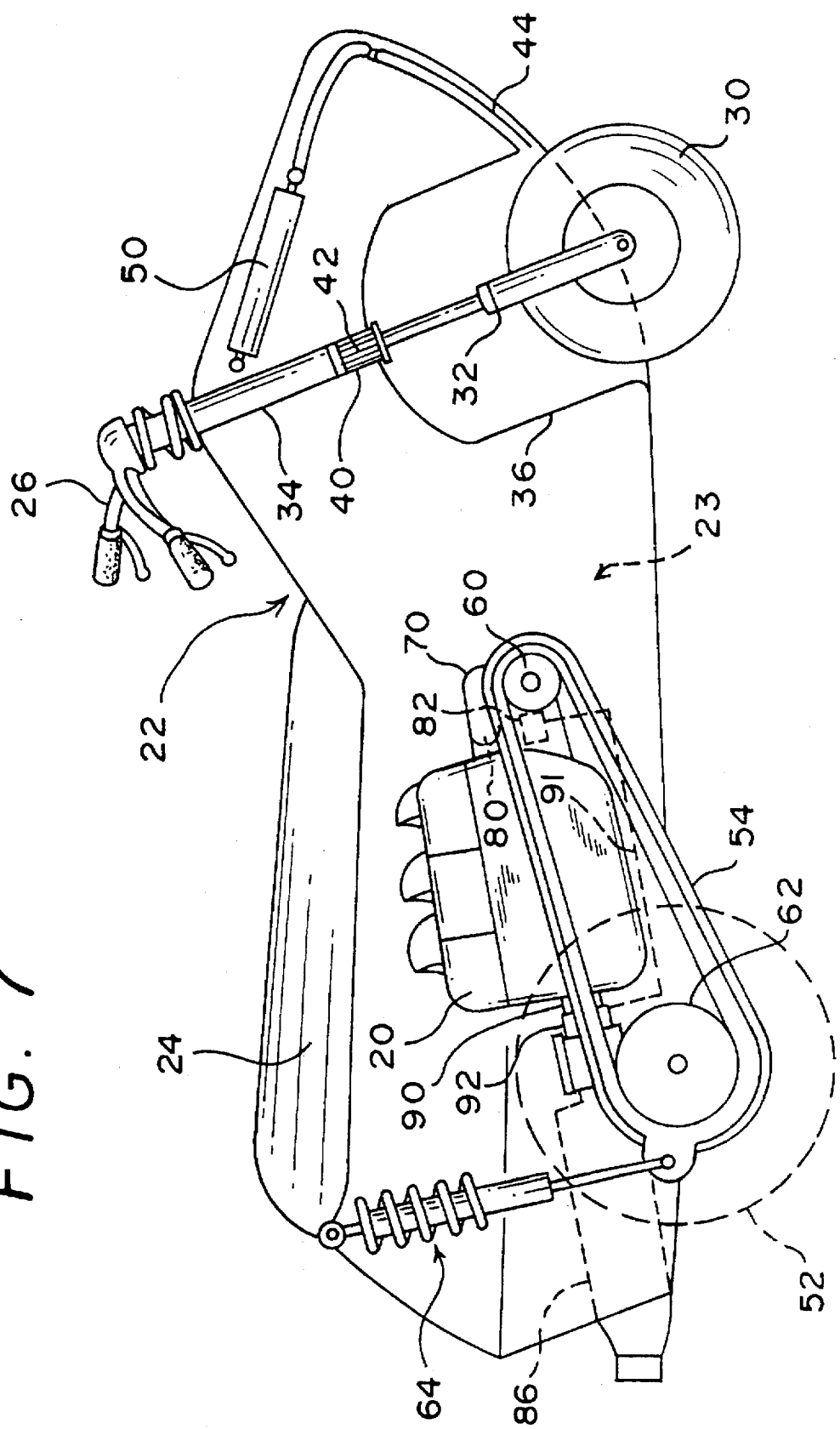
FIG. 7 is a diagrammatic side view similar to FIG. 1 but showing a second embodiment of the present invention.

FIG. 7 shows a more compact embodiment of the vehicle of FIGS. 1 and 2. In the FIG. 7 embodiment, the engine 20 has been turned through 180 degrees and displaced rearwardly with the clutch 80, output shaft 78, a detachable coupling 82 and the gear case 70 now being located at the forward end of the engine. This enables the two rear wheels 52 to be moved forwardly within the length of the body 22, as can be appreciated in FIG. 7. The rear wheel suspension units 64 connect to the distal ends of the same swinging arms 54 with the rear wheels 52 still laterally outside the body 22. An auxiliary drive 90 extending from the rear end of the engine drives the water jet pump 86, via a disengageable dog clutch 92. The dog clutch 92 and the sleeve 82, drivingly connecting the engine to the jet pump or the differential gear case 70, are interconnected by a linkage 91 passing under the engine 20 so that the engine only drives either the jet pump or the rear wheels. In this embodiment (and the embodiment of FIG. 8), the sleeve 82 may be replaced by a dog clutch. The rest of the components, mechanisms and operation of this FIG. 7 embodiment are essentially the same as described above in the embodiment of FIGS. 1 to 6.

The preferred embodiment of FIGS. 8 to 13 will now be described. In this embodiment, the three wheel amphibious vehicle is similar in layout to the embodiment of FIG. 7, but the personal watercraft body 22 has been modified by widening the rear (or preferably the rear and main portion of the body 22) and adding rear wheel wells 96 to completely enclose the rear wheels when retracted as in FIG. 8; this will be described later in greater detail with reference to FIGS. 11, 12 and 13. The front wheel well 36, the sliding cover 44, the suspension and detachable steering for the front wheel 30, the general independent suspension of and drive to the rear wheels 52, the retracting and lowering of the wheels 30, 52, the type of engine 20, the seat 24, the remainder of the body 22, and the water jet pump unit 86 are all essentially as shown in and described with reference to FIGS. 1 to 7. The positioning of the engine 20 and the rear wheels 52 is similar to that in the FIG. 7 embodiment. The rear wheels 52 are driven through the now forward, but disconnectable, differential gearing 70 incorporated with the clutch housing 80 as in FIG. 7. The differential gearing of gear case 70 separately drives the shafts 56 carrying drive sprockets 60.

FIG. 8 particularly illustrates the cooling system for the engine 20, this cooling system also being employed in the embodiments of FIGS. 1 and 7. Instead of being salt water cooled as in conventional personal watercraft, the engine 20 is cooled by a closed circulating coolant system so improving the life of the engine. The coolant may be fresh water, but is preferably a water/antifreeze mixture. The coolant passes rearwardly and downwardly from the engine 20 through a conduit 98, then forwardly through a central coolant chamber 100 of a heat exchanger 102, finally exiting from the forward end of the coolant chamber 100 and returning to the front of the engine 20 via a conduit 104. The coolant is heated as it passes through passages in the engine 20 and is then cooled as it passes through the heat exchanger 102, this continuous re-circulation being effected by a conventional water pump mounted on the engine 20. The heat exchanger 102 is mounted in and through the bottom 106 of the personal watercraft body 22 with thick cooling fins 108 extending downwardly below the bottom 106. The bottom 106 forms a planing surface on which the personal watercraft hydroplanes when driven fast in water. An upper chamber 110 of the heat exchanger 102 has many parallel passages for cooling air flow, this cooling air entering two air intakes 112 in an upper forward portion of the body 22, as shown in FIG. 8, and being conducted through two air intake tubes 114 to the forward end of the upper chamber 110. The cooling air then passes rearwardly through the air chamber 110 exiting at the rear end through one or more air discharge tubes 116. Finally, the cooling air is discharged through one or more discharge ports 118 in the rear of the body 22 above the water jet unit 86. It will be noticed that the engine coolant passes through the heat exchanger 102 countercurrent to the external cooling media passing through the upper chamber 110 and/or over the cooling fins 108 exposed below the body 22 and its planing surface 106. The directions of flow of the engine coolant, cooling air, and water (or air) under the body 22 are indicated by arrows in FIG. 4.

It is noted that with a boat being driven at cruising speed through water, an engine works harder, say twice as hard or harder, than when an engine powers an automobile at cruise speed on land. Also, air speed for cooling the engine on water is usually less than for cooling on land, so rendering air cooling less effective on water.

With the present invention, when the vehicle is in water, the main cooling in the heat exchanger 102 comes from water contacting the fins 108, particularly as the vehicle travels forwardly and the fins move through the water with the water relatively flowing rearwardly over, i.e. along and between, the fins 108. Ambient air may also flow rearwardly from the air intakes 112 through the upper chamber 110 providing additional cooling in the heat exchanger 102. More importantly, in the water mode, this ambient air flow cools the upper closure of the heat exchanger to mitigate heat from the heat exchanger 102 being transmitted into the internal sealed environment of the vehicle hull.

But, when the vehicle is operated on land, with the wheels 30, 52 extended downwardly below the body 22, the main cooling comes from the ambient air flowing through the upper chamber 110. Additional cooling is also obtained by ambient air flowing over the downwardly extending fins 108 as the vehicle is driven along.

Air may enter the air intakes 112 due to a ram effect as the vehicle moves forwardly, or one or more electrically driven fans may be associated with the intake tubes 114 to draw air in through the intakes 112 and force the air through the upper chamber 110. The intake tubes 114 are provided adjacent the intakes 112 with conventional water traps to prevent water passing down tubes 114. Hinged closure flaps may be provided for closing the air intakes 112. Similarly, water traps are provided in the coolant air discharge tubes 116.

Figure 9:
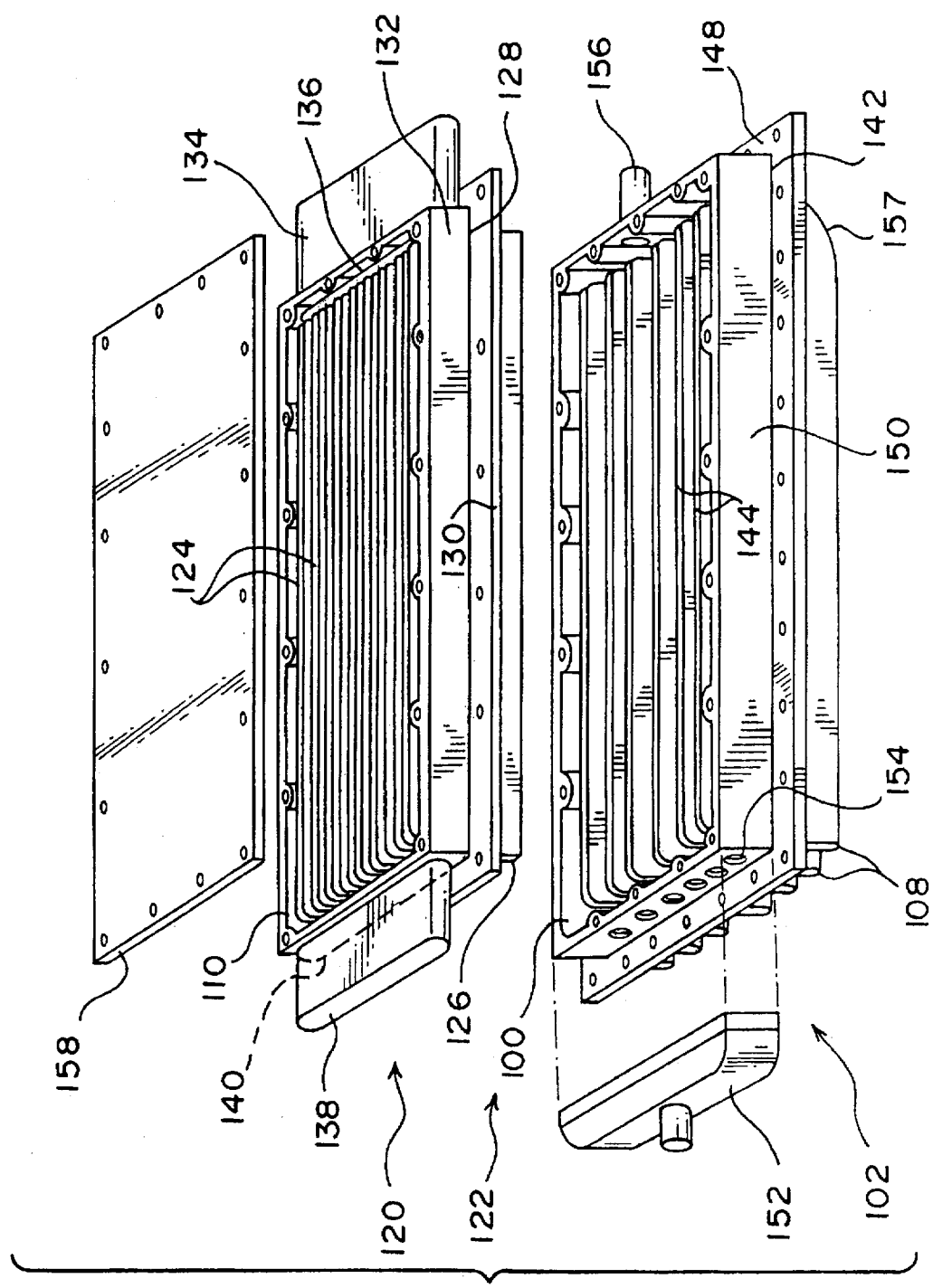
FIG. 9 is an exploded view of a heat exchanger of an engine cooling system of the embodiments of FIGS. 1, 7 and 8.

FIG. 9 shows an exploded perspective view of the heat exchanger 102. There are two main body members, an upper member 120 defining the upper air chamber 110, and a lower member 122 defining the central coolant chamber 100 and forming the externally extending cooling fins 108.

The upper member 120 is formed as a copper or aluminum casting having a greater number of thin parallel upwardly extending cooling fins 124 and a lesser number of thicker parallel downwardly extending heat exchange fins 126. The fins 124 and 126 are separated by a flat partition 128 extending outwardly around its periphery to form an outer flange 130. A rectangular peripheral wall 132 extends upwardly from the flange 130 and forms with the partition 128 an open topped chamber fully containing the thin fins 124. A flat top cover 158 made of a heat insulating material (e.g. fiberglass) abuts the upper edge of the peripheral wall 132 to close the upper chamber 110. At the forward end of the chamber 110, an air intake manifold 134 communicates with a full width port 136 in the front side wall of the peripheral wall 132. Similarly, at the rear end of the chamber 110, an air exhaust manifold 138 communicates with a full width port 140 in the rear side wall of the peripheral wall 132.

The lower member 122 is formed as an aluminum casting having a central flat partition 142 with upwardly extending parallel thick and well spaced apart heat exchange fins 144, and somewhat similar downwardly extending thick external cooling fins 108. The central partition 142 has an outwardly extending peripheral flange 148 which, upon assembly, is bolted to the bottom of the sealed hull body 22. Inwardly of the flange 148 extends upwardly a peripheral wall 150 to which, upon assembly, the peripheral flange 130 of the upper member 120 is bolted to complete the central chamber 100. A gasket 151 (see FIG. 10) is sandwiched between the flange 130 and the upper edge of the peripheral wall 150 to seal the central chamber 100 to prevent leakage of coolant. At the rear end of the lower member 122, a full width coolant inlet manifold 152 registers with a series of inlet apertures 154 through the rear side wall of the rectangular peripheral wall 150, one such aperture 154 communicating with the channel between each pair of adjacent fins 144 (or the wall 150 and an adjacent fin 144). The engine coolant exits the central chamber 100 through a single coolant outlet 156 in the front wall of the rectangular peripheral wall 150.

When the upper and lower members 120, 122 are assembled, the fins 124, 126, 144, and 108 project in parallel vertical planes extending fore and aft of the hull body 22. Whereas the partitions 128 and 142 lie in parallel horizontal planes perpendicular to the fins. It should be noted that the leading edge 157 of each cooling fin 108 is curvedly forwardly and upwardly tapered towards the partition 142 for more streamlined movement through water. This tapering could be wedge shaped. Additionally or alternatively the leading edges of the fins may advantageously be curved or knife-edged in horizontal cross-section.

Figure 10:
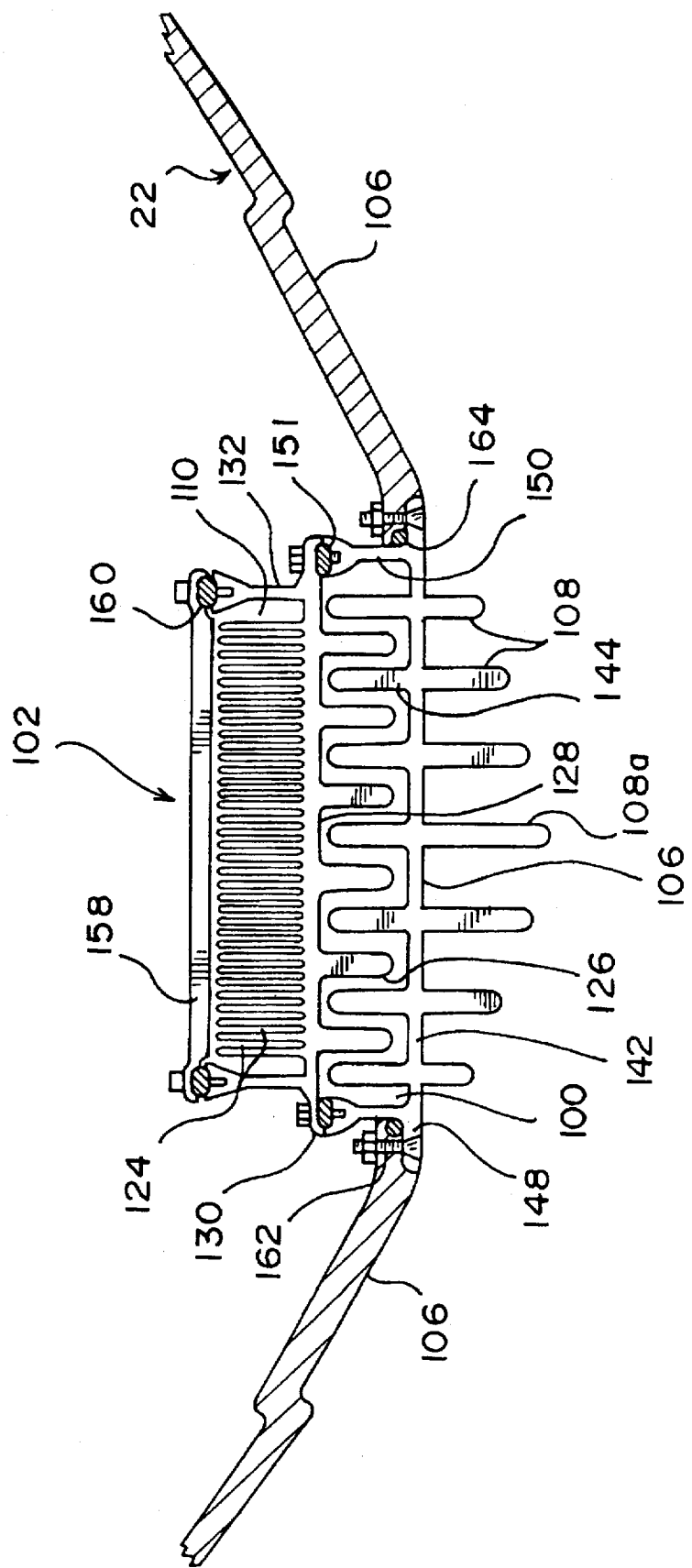
FIG. 10 is a cross-section of the heat exchanger of FIG. 9 and part of the bottom of the vehicle's body taken on the line 10—10 in FIG. 8.

FIG. 10 is a vertical section on the line 10—10 in FIG. 8 of the assembled heat exchanger 102 of FIG. 9. As can be seen in FIG. 10, the upper chamber 110 is closed over by the flat, heat-insulated cover plate 158 bolted to the upper edge of peripheral wall 132. A gasket 160 clamped between the cover plate 158 and wall 132 renders the upper chamber watertight as a safeguard should the hull overturn in water. The flange 130 around the partition 128 can be seen bolted to the upper edge of the peripheral wall 150. Equispaced interleaving of the heat exchange fins 126 and 144, with tip clearance, can be seen forming a plurality of parallel passageways for engine coolant. As can be seen, the thick fins 108, 126 and 144 are somewhat similarly sized and are spaced apart transversely the same distance. Fins 126 fall equally between fins 144, and fins 108 are coplanar with corresponding integral fins 144. The assembled heat exchanger 102 is disposed through a rectangular cutout in the bottom 106 of the sealed hull 22. The flange 148 around the partition 142 is bolted to a lip 162 of this cutout with an O-ring seal 164 forming a watertight seal between the heat exchanger 102 and the body bottom 106. The fins 108 extend downwardly from and are fully exposed below the hull bottom 106 for maximum contact with the external water (or air).

The cooling fins 108 extend downwardly from the bottom 106 of the hull to different depths and so are of different heights. A central fin 108a has the greatest height and extends the deepest. The fins on each side of this central fin 108a are progressively shorter in height the further they are located outwards from the central fin as clearly shown in FIG. 10. It will be noticed that the lower tips of the fins 108 substantially form a continuation of the curvature of the bottom 106 of the hull. Whereas the lower surface of the partition 142 forms part of and is continuous with the planing surface of the hull. Lengthwise the lower surface of the partition 142 may extend, for example, to 60% of the length of the personal watercraft body 22.

The cooling fins 108 may be of different sizes and of different spacing to the internal fins 144 dependent upon the planing characteristics of the hull 22 and the desired cornering performance of the amphibious personal watercraft. Thus, the bottom fins 108 not only serve a cooling function, especially in water, but also serve as a design parameter to improve the planing and cornering performance of the vehicle in the water mode.

The fins 124 for air cooling are substantially thinner, closer together, and more numerous than the fins 108 for water cooling or the heat exchange fins 126, 144. This provides a much larger surface area for air cooling by the fins 124 than the surface area for water cooling by the fins 108. Preferably, the ratio of the total surface area of all the fins 124 to that of all the fins 108 is at least 20:1, preferably 25:1.

As will be apparent, heat from the engine coolant is transmitted to the heat exchange fins 126, 144 which in turn conductively transmit this heat through the partitions 128, 142 respectively to the air cooled fins 124 and the water or air cooled fins 108. By having the engine coolant flow countercurrent with respect to both the cooling air passing over the fins 124 and the cooling water or air passing over the fins 108, an improved efficiency of heat exchange is obtained.

Figure 11:
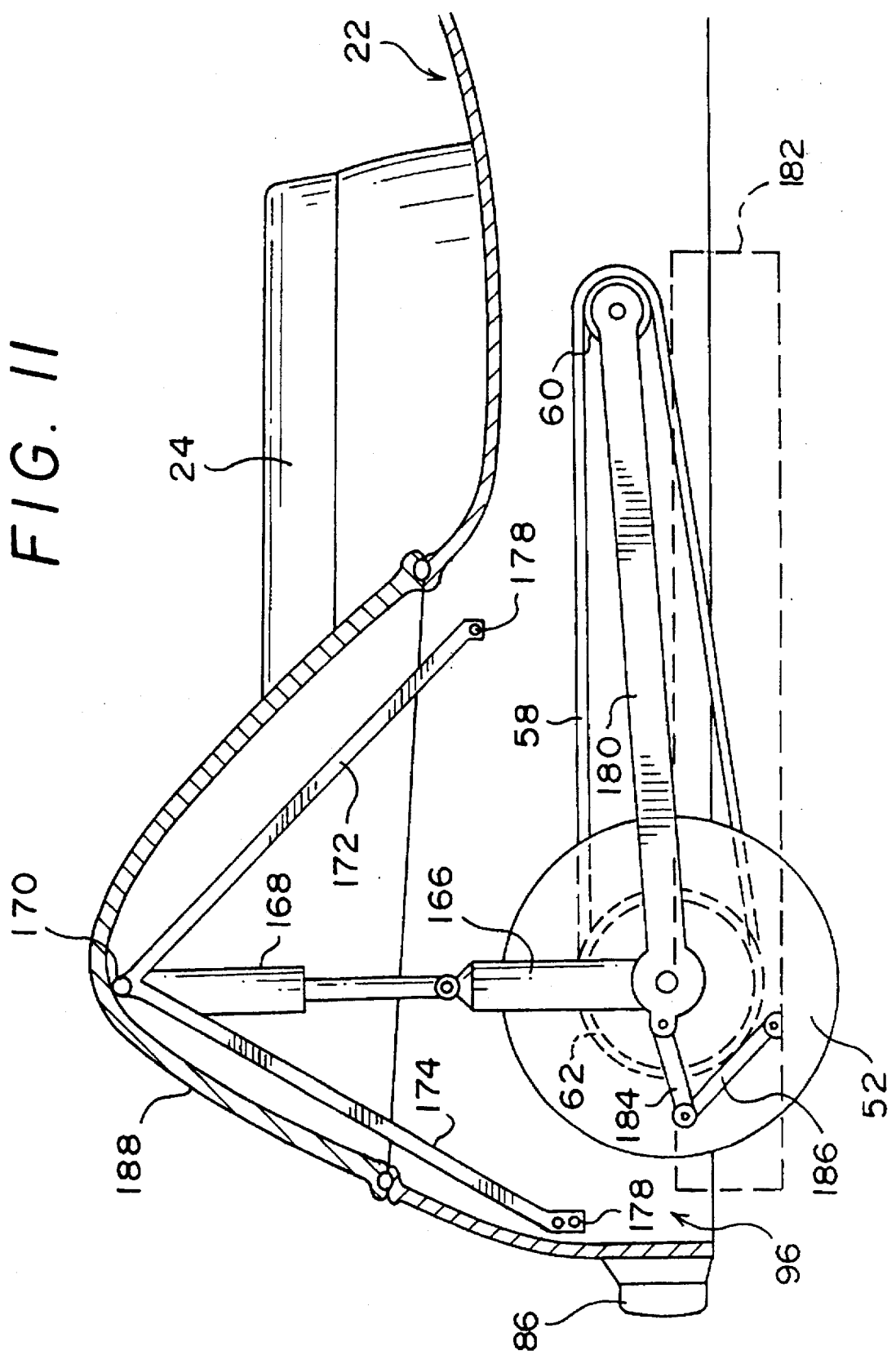
FIG. 11 is a side view, partly sectioned, of the rear portion of the embodiment of FIG. 8 showing suspension and drive details of the right rear wheel.
Figure 12:
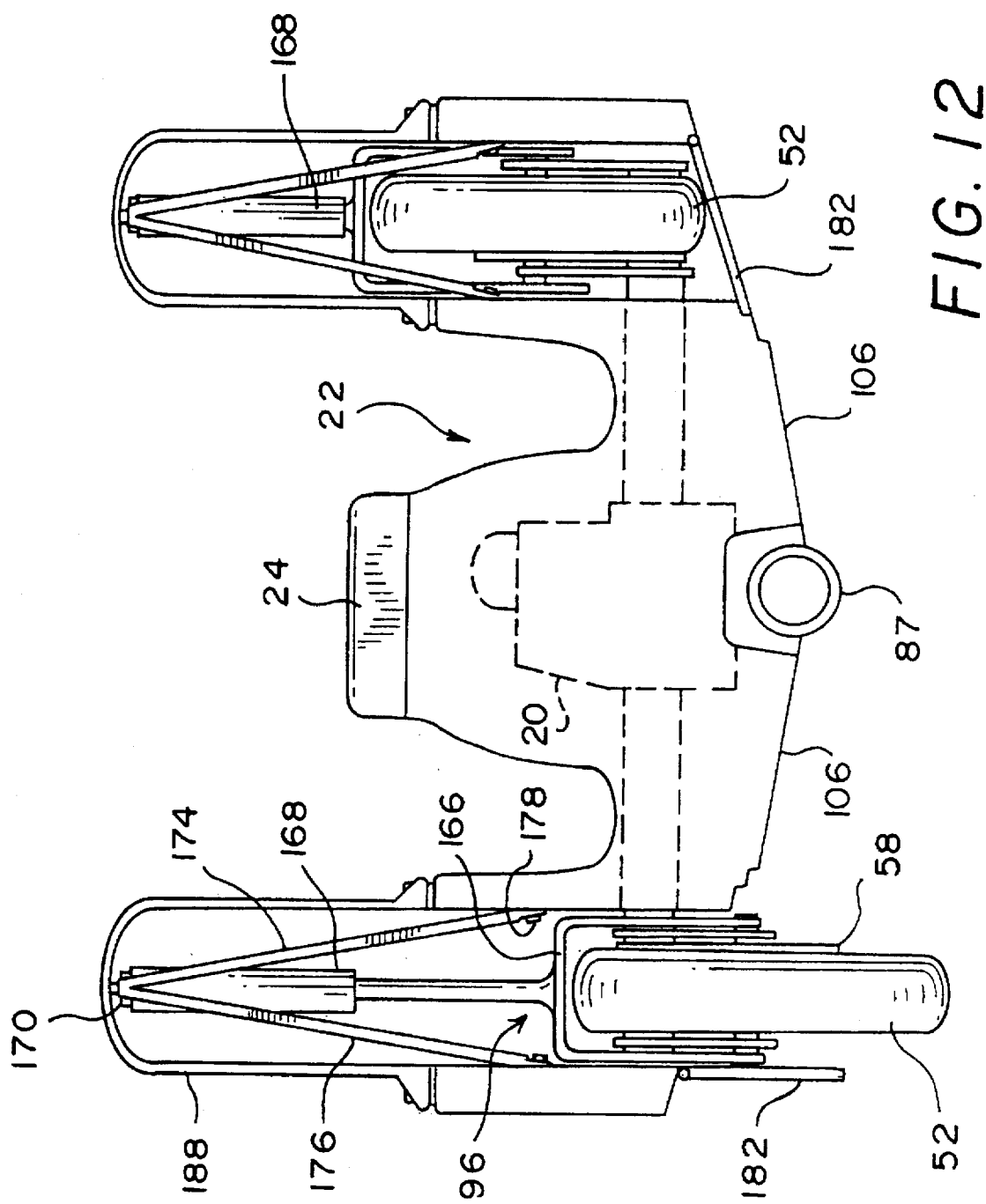
FIG. 12 is a partial rear view, partly sectioned, of the embodiment of FIG. 8 showing the left rear wheel extended and the right rear wheel retracted.

FIGS. 11, 12 and 13 illustrate the suspension and housing of the rear wheels 52. Each rear wheel is rotatably mounted in a vertical wheel fork 166. A combined hydraulic cylinder and suspension unit 168 is rigidly attached at a lower end to the top of the wheel fork 166. The upper end of the unit 168 is pivotally connected to and supported by the apex 170 of a tripod having three legs 172, 174, 176 the lower ends of which are attached to the body 22 by bolts 178. As the suspension unit 168 handles the main vertical load on each rear wheel 52, a swinging arm connecting each wheel 52 to, and for swinging movement about, the rotational axis of drive sprocket 60, can be of lightweight construction. This swinging arm comprises two parallel struts 180 (see FIGS. 11 and 13), one on each side of the wheel. The timing belt 58 between the drive sprocket 60 and rear wheel sprocket 62 is disposed on the inboard side of the wheel 52 between the wheel and the inboard strut 180 (see FIG. 13). Each rear wheel with its suspension system and drive belt is housed in its rear wheel well 96. The rear wheel is raised fully within its well 96 by operation of the hydraulic cylinder of unit 168 as previously described in relation to the embodiments of FIGS. 1 and 7, and the wheel is similarly lowered to a road position. A hinged closure flap 182 is provided for closing the bottom of the rear wheel well 96 when the rear wheel is stowed upwardly.

The flap 182 is pivotally attached to an outer lower edge of the wheel well 96. A linkage, pivotally connected to the flap 182 and the fork 166, effects automatic opening and closing of the well 96 by the flap 182 when each rear wheel 52 is lowered for road driving and raised for water travel, respectively. The flap closure/opening linkage comprises two pivotally connected levers 184, 186 disposed as in FIG. 11. When the rear wheel is in its lowered road position, the upper lever 184 is somewhat horizontal and the lower lever 186 extends downwardly with an acute angle between the levers. This enables the rear wheel 52 to follow normal up and down movement, afforded by the suspension during road travel, without effectively causing the flap 182 to pivot (or tend to close). However, when the rear wheel is hydraulically retracted to the raised position for water travel, the two levers 184, 186 relatively pivot till aligned, and then pull the flap 182 upwards to close the wheel well 96.

The vehicle's body 22 is specially widened to accommodate the rear wheel wells 96. With the flaps 182 closed, this tends to give an improved and more stable water ride to the amphibious personal watercraft by increasing the width of the planing surface and enabling hydroplaning at a lower speed. These wheel wells 96 are formed as chambers passing completely through the body 22 from the top to the bottom, and closed over at the top by a dome-like fiberglass wheel cover 188, as shown in FIGS. 11 and 12. The lower edge of the cover 188 forms a water and air tight seal with the top of the body 22. The two domed covers 188, one on each side of the seat 24, extend upwardly above the seat and provide additional lateral support and protection for the rider whether using the vehicle on land or water. The covers 188 could be connected integrally to the body 22.

Most of the components used above, to modify a personal watercraft into an amphibious vehicle according to the present invention, can be obtained as currently available components for motorcycles, e.g. Harley Davidson components. The addition of these components does not substantially increase the weight of the personal watercraft making it feasible to keep the weight of the motorcycle/personal watercraft to about 600 pounds.

The amphibious vehicle of the present invention is particularly suitable for carrying aboard pleasure craft, such as large sailing boats and large motor launches. When needing to go ashore, the boat can be anchored offshore in relatively deep water and the motorcycle/personal watercraft lowered over the side into the water. The amphibious vehicle is used as a hydroplaning personal watercraft to reach the shore, the wheels then being lowered and the vehicle driven as a three wheel motorcycle up the beach and, as necessary, over land and/or road. Upon return, the motorcycle is driven into the water, the wheels retracted, and then the vehicle used as a high speed personal watercraft to return to the anchored boat.

It will be appreciated that should the amphibious personal watercraft inadvertently flip upside down when travelling on water, the sealed hull interior 23 serves the function of providing buoyancy to the amphibious vehicle to prevent it sinking, and also the function of protecting the engine 20 from the water. However, by having the engine, including its exhaust system, in the sealed hull interior 23, there is the problem of heat build-up in the sealed hull. This is especially so when stationary and/or idling, and more so when the amphibious vehicle is used as a land vehicle. The dual medium cooling system operating through the heat exchanger 102 mitigates this problem with good heat dissipation, and the heat insulating cover 158 further contributes to reducing heat build-up in the hull interior.

Some water jet pumps are now available which can be rotatably driven out of water without adverse effect upon the bearings of the pump. With such pumps, the pump can be driven also during land use of the amphibious vehicle, so allowing the arrangement for disconnecting the drive to the pump to be omitted if desired. Having the jet pump operating at the same time as initiating drive to the rear wheels may be advantageous when exiting the water on some beaches.

The above described embodiments, of course, are not to be construed as limiting the breadth of the present invention. Modifications, and other alternative constructions, will be apparent which are within the spirit and scope of the invention as defined in the appended claims.

I claim:

1. An amphibious vehicle, comprising:

a body having a front and a rear;

a heat engine having an ambient air cooling system primarily employed for cooling the engine during travel on land, and an external water cooling system primarily for cooling the engine during travel in water;

said body having a sealed interior with said engine housed in said sealed interior;

a retractable and steerable front wheel located at the front of said body;

at least one retractable rear wheel located at the rear of said body;

at least one of said wheels being rotatably drivable by said engine;

a propulsion unit for propelling said vehicle in water;

said propulsion unit being drivable by said engine;

said engine being directly cooled by a re-circulating liquid coolant; and said cooling systems including a heat exchanger having an air chamber through which ambient air flows, a liquid coolant chamber through which said liquid coolant of said engine flows, and a surface exposed outside said body in contact with external water during water travel.

2. The amphibious vehicle of claim 1, wherein said surface comprises a plurality of fins.

3. The amphibious vehicle of claim 2, wherein:

said liquid coolant chamber is disposed between said air chamber and said surface;

said fins are located under said body and extend parallel to each other in a direction from said front to said rear; and the fins extend downwardly to different depths.

4. The amphibious vehicle of claim 1, having two rear wheels each mounted on a swinging arm pivotally connected to said body, and differential gearing, each rear wheel being drivable by said engine via said differential gearing.

5. An amphibious vehicle, comprising:

a body having a front and a rear;

a heat engine having an ambient air cooling system primarily employed for cooling the engine during travel on land, and an external water cooling system primarily for cooling the engine during travel in water;

said body having a sealed interior with said engine housed in said sealed interior;

a retractable and steerable front wheel located at the front of said body;

at least one retractable rear wheel located at the rear of said body;

at least one of said wheels being rotatably drivable by said engine;

a propulsion unit for propelling said vehicle in water;

said propulsion unit being drivable by said engine;

said body having a planing surface on which said amphibious vehicle can hydroplane when propelled in water; and said external water cooling system including at least one cooling fin extending downwardly from said planing surface.

6. An amphibious vehicle, comprising:

a body having a front and a rear with a wheel well at said front;

a front steerable wheel mounted in said wheel well and connected by a telescopic strut to a steering member mounted on said body for steering said front wheel;

extension of said telescopic strut extending said front wheel out of said wheel well and steeringly engaging said steering member with said front wheel;

retraction of said telescopic strut retracting said front wheel into said wheel well and disconnecting steering engagement between said steering member and said front wheel; and said telescopic strut including two splined elements movable into and out of engagement with each other by extension and retraction, respectively, of said telescopic strut.

7. An amphibious vehicle, comprising:

a body having a front and a rear;

a heat engine having an ambient air cooling system primarily employed for cooling the engine during travel on land, and an external water cooling system primarily for cooling the engine during travel in water;

said body having a sealed interior with said engine housed in said sealed interior;

a retractable and steerable front wheel located at the front of said body;

two retractable rear wheels located at the rear of said body, each rear wheel being mounted on a swinging arm pivotally connected to said body;

differential gearing, each rear wheel being rotatably drivable by said engine via said differential gearing;

a propulsion unit for propelling said vehicle in water;

said propulsion unit being drivable by said engine;

a separate hydraulic cylinder connected between each wheel and said body for retracting and lowering said wheels, respectively, for water and land travel; and means for simultaneously operating the hydraulic cylinders to retract and lower all of said wheels together.

8. An amphibious vehicle, comprising:

a body;

a plurality of wheels connected to said body for supporting said amphibious vehicle on land;

a heat engine mounted in said body for driving said amphibious vehicle, said engine being directly cooled by a re-circulating liquid coolant;

a heat exchanger mounted through said body and comprising an air chamber, a liquid coolant chamber, and at lease one cooling fin;

said liquid coolant chamber being in thermal contact with said air chamber and said cooling fin, and being connected to said engine to permit circulation of the liquid coolant through said engine and said liquid coolant chamber;

an air inlet and an air outlet both connected to said air chamber to enable passage of ambient air in through said air inlet, through said air chamber, and out through said air outlet; and said cooling fin being exposed externally of said body, and when said amphibious vehicle is in water said cooling fin being immersed in the water.

9. The amphibious vehicle of claim 8, wherein said heat exchanger has more than one said cooling fin.

10. The amphibious vehicle of claim 9, wherein said body has a top and a bottom, and the cooling fins extend from said bottom.

11. The amphibious vehicle of claim 8, wherein said air chamber has internal air fins between which said ambient air passes, said liquid coolant chamber has a first series of internal fins conductively in communication with said air fins and a second series of internal fins conductively in communication with said externally exposed cooling fin.

12. The amphibious vehicle of claim 11, wherein said first and second series of internal fins are interleaved with each other.

13. The amphibious vehicle of claim 11, wherein said internal air fins and said first series of internal fins extend from opposite sides of a first heat conductive member, and said second series of internal fins and said externally exposed cooling fin extend from opposite sides of a second heat conductive member.

14. The amphibious vehicle of claim 11, wherein:
said heat exchanger has a plurality of cooling fins exposed externally of said body and immersed in water when said amphibious vehicle is in water; and
said internal air fins and said externally exposed cooling fins have total surface areas in the ratio of at least 20 to 1.

15. The amphibious vehicle of claim 11, wherein:
said internal air fins and said first series of internal fins are formed by a first metal casting;
said second series of internal fins and said externally exposed cooling fin are formed by a second metal casting secured to said first metal casting;
said body has a hole therein; and
at least one of said castings is secured to said body around a periphery of said hole.

16. The amphibious vehicle of claim 8, wherein:
said body has a planing surface on which said vehicle hydroplanes when driven in water; and
said cooling fin extends downwardly from said planing surface.

17. An amphibious vehicle, comprising:
a body having a sealed interior and no open load carrying area capable of retaining water, said amphibious vehicle when flipped upside down in water not submerging;
a seat on said body externally thereof enabling a person to ride on said body as opposed to riding in said body;
an internal combustion engine mounted in said sealed interior;
a jet pump drivable from said engine;
a front steerable wheel mounted in a wheel well at a front of said body, said front wheel extending from said wheel well for travel on land and being retractable into said wheel well for travel in water;
said front wheel well being exterior to said sealed interior;
a cover movably mounted on said body and operable to close said wheel well when said front wheel is retracted into said wheel well;
at least one rear wheel retractably mounted on said body exterior to said sealed interior; and
a transmission connected between said engine and at least one of said wheels.

18. The amphibious vehicle of claim 17, further comprising:
handlebars rotatably mounted on said body for steering said amphibious vehicle on land and in water;
said jet pump having a pivotal jet nozzle connected to and pivotal by said handlebars; and
a telescopic member connected between said front wheel and said handlebars for accommodating the extending and retracting of said front wheel, said front wheel turning with said handlebars when said telescopic member is telescopically extended, but said front wheel being rotatably disconnected from said handlebars when said telescopic member is telescopically retracted.

19. The amphibious vehicle of claim 17, further comprising:
a rear wheel well into which said rear wheel is retractable;
a movable rear cover mounted on said body for opening and closing said rear wheel well;
a raisable suspension mounting said rear wheel on said body; and
a linkage connected between said rear cover and said suspension to effect opening and closing of said rear wheel well by said cover as said suspension is respectively lowered and raised.

20. The amphibious vehicle of claim 17, wherein said transmission includes a drive coupling arrangement selectively operable to couple said engine to drive said jet pump during water travel and said at least one of said wheels during land travel.

21. An amphibious vehicle, comprising:
a body having a front and a rear with a wheel well at said front;
a front steerable wheel mounted in said wheel well and connected by a telescopic strut to a steering member mounted on said body for steering said front wheel;
extension of said telescopic strut extending said front wheel out of said wheel well and steeringly engaging said steering member with said front wheel;
retraction of said telescopic strut retracting said front wheel into said wheel well and disconnecting steering engagement between said steering member and said front wheel; and
said telescopic strut comprising:
a hydraulic cylinder rotatably mounted in said body;
a first ring of splines in said cylinder;
a support member to which said front wheel is rotatably mounted, said support member being telescopically mounted in said cylinder; and
a second ring of splines on said support member, said second ring of splines being slidably engageable with and slidably disengageable from said first ring of splines by telescopic extension and retraction of said support member out of and into, respectively, said cylinder.

22. An amphibious vehicle, comprising:
a body having a front and a rear;
a motor for propelling said vehicle on land and water;
said body having a sealed interior housing said motor;
a front wheel well located at the front of said body exterior to said sealed interior;
a front steerable wheel mounted retractably in said front wheel well;
a seat mounted on said body externally thereof and above said sealed interior;
a pair of rear wheel wells located at the rear of said body on opposite sides of said seat;
a rear wheel retractably mounted in each rear wheel well;
an upper portion of each rear wheel well being formed by a somewhat dome-shaped cover connected to said body and extending upwardly alongside said seat, these two covers being spaced transversely from said seat and providing protection for a rider when seated on said seat; and retractable suspension members for said rear wheels accommodated inside said covers.

23. The amphibious vehicle of claim 22, wherein:

each suspension member comprises a wheel mounting fork attached to a lower end of a telescopic member; and a tripod of struts extend upwardly from said body inside each cover, an upper end of said telescopic member being connected to an apex of said tripod.

24. The amphibious vehicle of claim 22, wherein said vehicle is an amphibious personal watercraft operative as a personal watercraft in water and a three-wheel motorcycle on land, and each said cover extends upwardly above said seat.

* * * * *